UNITED STATES PATENT OFFICE.

RENÉ BOHN, OF MANNHEIM, AND CARL IMMERHEISER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CHROMIUM COMPOUNDS OF OXYANTHRAQUINONE SULFONIC ACIDS AND PROCESS OF MAKING SAME.

1,090,123.  Specification of Letters Patent.  Patented Mar. 10, 1914.

No Drawing.    Application filed December 3, 1912.  Serial No. 734,697.

*To all whom it may concern:*

Be it known that we, RENÉ BOHN and CARL IMMERHEISER, citizen of the Swiss Republic and subject of the King of Bavaria, residing, respectively, at Mannheim and Ludwigshafen-on-the-Rhine, Germany, have invented new and useful Improvements in Chromium Compounds of Oxyanthraquinone Sulfonic Acids and Processes of Making Same, of which the following is a specification.

In the specification of British Patent No. 1117/78 it is stated that, by neutralizing the free alizarin sulfonic acid, or purpurin sulfonic acid, with chromium oxid, after carefully separating the mineral acid, soluble chromium salts can be obtained. We have now found that, by heating oxyanthraquinone sulfonic acids, under which term we also include salts and derivatives thereof, with chromium salts in the presence of water, we can obtain different and new compounds which are intensely colored and generally very easily soluble in water, so that they cannot be precipitated from their aqueous solutions by the addition of indifferent salts. They can be obtained, however, in the solid state, for instance by evaporation of the solution *in vacuo*, or by the addition of certain organic agents (such for instance as ethyl-alcohol) to the aqueous solutions. One molecular proportion of an oxyanthraquinone sulfonic acid can combine with varying quantities of chromium. The chromium salts obtainable according to the said British Patent No. 1117/78 can, for instance by treatment with chromium fluorid, be converted into the products of the present invention. The compounds obtainable according to this invention differ from the chromium salts obtained according to the said Patent No. 1117/78 in that the new compounds, on being applied to the vegetable fiber and steamed or treated with alkaline reagents, such for instance as ammonia, or sodium carbonate solution, or with damp ammoniacal fumes, give rise to strong blue-green to violet shades of excellent fastness against the action of washing and light.

The new compounds can be employed either for the production of coloring matters, or of ink, and they are exceptionally useful for the production of color lakes, because they can be precipitated on to a substratum either at ordinary or at raised temperature, and either in the presence or absence of alkalis or agents having an alkaline reaction. Instead of precipitating the already made chromium compound in this manner, the oxyanthraquinone sulfonic acid, or a salt, or derivative, thereof, can be heated with a solution of a chromium salt in the presence of a substratum and then, if necessary, be precipitated by means of alkali or of an alkaline reacting agent, or of a mixture of both, either at ordinary or at raised temperature. The new color lakes thus obtained have valuable shades of color and are very fast. Particular valuable lakes are obtainable from the chromium compound of hexa-oxyanthraquinone-disulfonic acid (acid alizarin blue BB).

The following are examples of how our invention can be carried into practical effect, but the invention is not confined to these examples. In Examples 1 and 2 the parts are by weight.

Example 1: Introduce 10 parts of the sodium salt of hexa-oxyanthraquinone-disulfonic acid into a solution of 20 parts of chromium fluorid in 600 parts of water, and heat the mixture until it boils. The color of the solution, which is at first reddish, becomes brilliant green-blue, and when the shade no longer alters toward green the formation of the new compound is complete. If desired, the solution can be strongly evaporated without the chromium compound separating out. During the boiling, part of the hydrofluoric acid, which is set free, escapes.

Instead of chromium fluorid, other chromium salt can be employed, such for instance as chrome alum, chromium chlorid and chromium formate, and in an analogous manner other oxyanthraquinone sulfonic acids, or salts or derivatives thereof, can be employed.

As concentrated acids are liable to affect the chromium compound, it is preferred, before evaporating the solution, to add a compound (such for instance as bisulfite) which has the power of fixing the acid. When chromium fluorid is employed, the addition of silica, or the like, is advantageous for this purpose. For instance, when commencing to evaporate down the solution obtained according to the foregoing example, it is advantageous to add 2.5 parts of glass powder.

The following table gives some instances of the oxyanthraquinone sulfonic acids which can be employed according to this invention, and the color of the solution of their chromium compounds in water:—

| Chromium compound of— | Color of solution of chromium compounds in water. |
|---|---|
| 1-Oxyanthraquinone-5-sulfonic acid | Red-violet. |
| 1-Oxyanthraquinone-6-sulfonic acid | Orange-red. |
| 1.2-Dioxyanthraquinone-3-sulfonic acid | Yellowish red. |
| 1.2-Dioxyanthraquinone-4-sulfonic acid | Orange-red. |
| 1.2-Dioxyanthraquinone-7-sulfonic acid | Carmine-red. |
| 1.4-Dioxyanthraquinone-2-sulfonic acid | Reddish blue. |
| 1.4-Dioxyanthraquinone-6-sulfonic acid | Blue-violet. |
| 1.5-Dioxyanthraquinone-2.6-disulfonic acid | Carmine-red. |
| 1.5-Dioxyanthraquinone-tetrasulfonic acid | Red-violet. |
| 4.8-Dinitro-1.5-dioxyanthraquinone-2.6-disulfonic acid. | Bluish red. |
| 1.8-Dioxyanthraquinone-disulfonic acid | Orange. |
| 1.2.4-Trioxyanthraquinone-3-sulfonic acid | Red-violet. |
| 1.2.4-Trioxyanthraquinone-6-sulfonic acid | Bordeaux red. |
| 1.2.5-Trioxyanthraquinone-6-sulfonic acid | Violet-blue. |
| 4-Nitro-1.5.8-trioxyanthraquinone-disulfonic acid. | Blue-green. |
| 1.4.7.8-Tetraoxyanthraquinone-sulfonic acid | Reddish blue. |
| 1.4.5.8-Tetraoxyanthraquinone-sulfonic acid | Blue. |
| 1.3.5.7-Tetraoxyanthraquinone-sulfonic acid | Yellow-red. |
| Pentacyanin-monosulfonic acid | Blue. |
| Hexacyanin-monosulfonic acid | Greenish blue. |
| Hexa-oxyanthraquinone-2.6-disulfonic acid | Green-blue. |
| 4.8-Diamino-1.5-dioxyanthraquinone-monosulfonic acid. | Bluish green. |

Example 2: Introduce, while stirring, the aqueous solution obtained according to the foregoing example into a substratum prepared from 200 parts of heavy spar, 100 parts of aluminium sulfate, 50 parts of calcined sodium carbonate and 120 parts of barium chlorid, and then, if necessary, heat the mixture or add a small quantity of sodium carbonate in order to fix the chromium compound. The color lake can be worked up in the usual manner and is of a pure blue-green color of excellent fastness against the action of light, and it also has good covering power.

Other substrata are suitable for the purposes of this invention, for example zinc white, milk of lime, white lead, talc, fullers' earth, lithopone, chrome yellow, or red lead, may be used.

In a similar manner, color lakes can be obtained from the other compounds obtainable as hereinbefore described and, if desired, the lakes can be produced in the presence of Turkey red oil, or similar compound.

Example 3: Prepare a printing paste from 200 grams of the solution obtained according to the foregoing Example 1, 500 grams of thickening (prepared from 44 grams of acetic acid, 66 grams of starch, 22 grams of glycerin, and 6.6 grams of gum tragacanth) 40 grams of formic acid and 260 grams of water. Print this on vegetable fiber, steam in the Mather-Plat apparatus for 5 minutes, wash with water and finish in the usual manner. A blue-green shade of excellent fastness against the action of washing and light is obtained. Instead of steaming, the printed material can be treated, for from 1 to 2 minutes, with a 3% solution of sodium carbonate, or with a solution containing 10 grams of 20% ammonia per liter, and then washed with water and finished in the usual manner.

The following table gives some of the shades obtainable in a similar manner from the chromium compounds of other oxyanthraquinone-sulfonic acids:—

| Chromium compound of— | Color of print. |
|---|---|
| 1.2-Dioxyanthraquinone-3-sulfonic acid | Red-brown. |
| 1.2-Dioxyanthraquinone-4-sulfonic acid | Brown. |
| 1.2-Dioxyanthraquinone-7-sulfonic acid | Bluish Bordeaux |
| 1.4-Dioxyanthraquinone-2-sulfonic acid | Black-green. |
| Anthrarufin disulfonic acid | Red-violet. |
| Chrysazin disulfonic acid | Bordeaux. |
| 1.2.5-Trioxyanthraquinone-6-sulfonic acid | Reddish blue. |
| Alizarin Bordeaux sulfonic acid | Blue. |
| 1.4.5.8-Tetraoxyanthraquinone sulfonic acid | Blue-green. |
| Anthrachrysone disulfonic acid | Red-brown. |
| Pentacyanin monosulfonic acid | Blue-green. |
| Hexacyanin monosulfonic acid | Green. |
| Hexaoxyanthraquinone-disulfonic acid | Blue-green. |
| 4-Nitro-1.5.8-trioxyanthraquinone-2.6-disulfonic acid. | Blue-green. |

Now what we claim is:—

1. The process of producing chromium compounds of oxyanthraquinone-sulfonic acids by heating an oxyanthraquinone-sulfonic acid, with a chromium salt in the presence of water.

2. The process of producing a chromium compound of hexa-oxyanthraquinone-disulfonic acid by heating hexa-oxyanthraquinone-disulfonic acid with chromium fluorid in the presence of water.

3. The process of producing a chromium compound of hexa-oxyanthraquinone-disulfonic acid by heating hexa-oxyanthraquinone-disulfonic acid with chromium fluorid in the presence of water and of silicious material.

4. As new articles of manufacture the compounds which can be obtained by heating an oxyanthraquinone-sulfonic acid with a chromium salt in the presence of water, which new compounds contain an oxyanthraquinone-sulfonic acid residue and chromium, which are soluble in water and are intensely colored, and which on being steamed in the presence of vegetable fiber yield insoluble lakes giving shades of excellent fastness.

5. As a new article of manufacture the compound which can be obtained by heating hexa-oxyanthraquinone-disulfonic acid with chromium fluorid in the presence of water, which new compound contains an oxyanthraquinone-sulfonic acid residue and chromium, and which is soluble in water yielding a green-blue solution, but on being steamed in the presence of vegetable fiber yields insoluble lakes giving green-blue shades of excellent fastness.

In testimony whereof we have hereunto set our hands in the presence of two subscribing witnesses.

RENÉ BOHN.
CARL IMMERHEISER.

Witnesses:
J. ALEC. LLOYD,
JOSEPH FEIFFER.